US012257467B2

(12) United States Patent
Birnkrant et al.

(10) Patent No.: US 12,257,467 B2
(45) Date of Patent: Mar. 25, 2025

(54) SYSTEM AND METHOD FOR FIRE SUPPRESSION BY COUPLING FIRE DETECTION WITH BUILDING SYSTEMS

(71) Applicant: Carrier Corporation, Palm Beach Gardens, FL (US)

(72) Inventors: Michael J. Birnkrant, Palm Beach Gardens, FL (US); May L. Corn, Palm Beach Gardens, FL (US); Marcin Piech, Palm Beach Gardens, FL (US); Changmin Cao, Palm Beach Gardens, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 773 days.

(21) Appl. No.: 17/255,117

(22) PCT Filed: Jun. 25, 2020

(86) PCT No.: PCT/US2020/039567
§ 371 (c)(1),
(2) Date: Dec. 22, 2020

(87) PCT Pub. No.: WO2020/264123
PCT Pub. Date: Dec. 30, 2020

(65) Prior Publication Data

US 2022/0249893 A1 Aug. 11, 2022

Related U.S. Application Data

(60) Provisional application No. 62/868,323, filed on Jun. 28, 2019.

(51) Int. Cl.
*A62C 3/16* (2006.01)
*A62C 37/36* (2006.01)
(Continued)

(52) U.S. Cl.
CPC ............ *A62C 99/0018* (2013.01); *A62C 3/16* (2013.01); *A62C 31/02* (2013.01); *A62C 37/36* (2013.01); *G08B 25/009* (2013.01)

(58) Field of Classification Search
CPC ...... G08B 25/009; G08B 17/00; A62C 37/36; A62C 31/02; A62C 3/16; A62C 99/0018;
(Continued)

(56) References Cited

U.S. PATENT DOCUMENTS

2007/0008099 A1* 1/2007 Kimmel ................ G08B 25/14 340/506
2009/0211773 A1* 8/2009 Gooch .................... A62C 3/16 169/46
2012/0073840 A1 3/2012 Prieur

FOREIGN PATENT DOCUMENTS

KR 101880864 7/2018
WO 2018089477 5/2018
(Continued)

OTHER PUBLICATIONS

International Preliminary Report on Patentability for International Application No. PCT/US2020/039567 issued on Dec. 28, 2021.
(Continued)

*Primary Examiner* — Christopher R Dandridge
(74) *Attorney, Agent, or Firm* — Carlson, Gaskey & Olds, P.C.

(57) ABSTRACT

An integrated fire suppression system includes a plurality of fire detection systems. Each of the fire detection systems is individually addressable. A control system is communicatively coupled to each of the fire detection systems. A plurality of building systems is communicatively connected to the control system. The plurality of building systems includes at least one of a fire suppression system, an alarm system, a heating ventilation and cooling (HVAC) system, a building power supply system, and a building security
(Continued)

system. The control system is configured to provide a localized response to a fire detection by at least one fire detection system in the plurality of fire detection systems, the localized response being a response in at least one of the plurality of building systems.

15 Claims, 2 Drawing Sheets

(51) Int. Cl.

| | |
|---|---|
| ***A62C 99/00*** | (2010.01) |
| ***G08B 25/00*** | (2006.01) |
| *A62C 31/02* | (2006.01) |

(58) Field of Classification Search

CPC ......... A62C 37/50; A62C 37/38; A62C 37/04; A62C 2/247; A62C 3/00; A62C 3/0214; F24F 11/33

See application file for complete search history.

(56) References Cited

FOREIGN PATENT DOCUMENTS

| | | | | |
|---|---|---|---|---|
| WO | WO-2018089477 A1 * | 5/2018 | ............... | A62C 3/16 |
| WO | WO 20180894770 * | 5/2018 | ............... | A62C 3/16 |

OTHER PUBLICATIONS

International Search Report and Written Opinion for International Patent Application No. PCT/US2020/039567 dated Oct. 9, 2020.

* cited by examiner

SYSTEM AND METHOD FOR FIRE SUPPRESSION BY COUPLING FIRE DETECTION WITH BUILDING SYSTEMS

CROSS-REFERENCE TO RELATED APPLICATION

This application claims priority to U.S. Provisional Application No. 62/868,323 filed on Jun. 28, 2019.

TECHNICAL FIELD

The present disclosure relates generally to fire suppression systems for a building, and more specifically to a system for improving fire suppression by incorporating building systems into the fire suppression process using a controller.

BACKGROUND

Data centers, and other large buildings housing critical operations or systems, require robust fire mitigation and suppression systems. In some cases, it is particularly important to prevent damage to other systems and to prevent operational interruptions of the other systems. This is particularly important when the systems occupy a large shared space, such as a room in a data center.

In some examples, fire suppression within operation critical rooms such as data centers is achieved using large dedicated fire suppression cylinders throughout each room of the building. The large suppression cylinders take up substantial amounts of floorspace and reduce the amount of room that can be used to house data systems, or any other systems.

SUMMARY OF THE INVENTION

In one exemplary embodiment an integrated fire suppression system includes a plurality of fire detection systems, each of the fire detection systems being individually addressable, a control system communicatively coupled to each of the fire detection systems in the plurality of fire detection systems, a plurality of building systems communicatively connected to the control system, the plurality of building systems including at least one of a fire suppression system, an alarm system, a heating ventilation and cooling (HVAC) system, a building power supply system, and a building security system, and wherein the control system is configured to provide a localized response to a fire detection by at least one fire detection system in the plurality of fire detection systems, the localized response comprising a response in at least one of the plurality of building systems.

In another example of the above described integrated fire suppression system the plurality of fire detection systems comprises a plurality of fiber based high sensitivity smoke detectors.

In another example of any of the above described integrated fire suppression systems the fire suppression system comprises a plurality of independently activated fire suppressant nozzles.

In another example of any of the above described integrated fire suppression systems each fire suppressant nozzle at least partially defines at least one fire suppression zone.

In another example of any of the above described integrated fire suppression systems the plurality of building systems comprises the HVAC system, and wherein the HVAC system comprises a plurality of vents configured to control airflow through a room.

In another example of any of the above described integrated fire suppression systems the HVAC system is configured to isolate a hazard zone of the room at least partially using the plurality of vents.

In another example of any of the above described integrated fire suppression systems the HVAC system further comprises a plurality of air curtain sources.

In another example of any of the above described integrated fire suppression systems the plurality of building systems comprises the building power supply system, and wherein the localized response comprises a power shut down localized to a hazard zone.

In another example of any of the above described integrated fire suppression systems the power shut down comprises a notification to a critical system within the hazard zone, and a power shutdown delay dependent on a backup time required for the critical system.

In another example of any of the above described integrated fire suppression systems the building control system comprises a memory storing a map correlating each fire detection system with a corresponding building location.

In another example of any of the above described integrated fire suppression systems the plurality of building systems comprises a security system, and wherein the security system is configured to identify a location of the fire detection.

In another example of any of the above described integrated fire suppression systems the localized response comprises isolating a zone in which the fire detection occurred using at least one of the building systems.

In another example of any of the above described integrated fire suppression systems the localized response comprises isolating the zone using at least two of the building systems.

An exemplary method for operating a fire suppression system includes detecting a fire via at least a first uniquely addressable fire detection system in a plurality of fire detection systems, identifying a zone corresponding to at least the first uniquely addressable fire detection systems, and providing a localized response via the fire suppression system and at least one other building system.

In another example of the above described method for operating a fire suppression system providing the localized response comprises isolating the zone from at least one adjacent zone using a building heating ventilation and cooling (HVAC) system.

In another example of any of the above described methods for operating a fire suppression system isolating the zone from the at least one adjacent zone using the HVAC system comprises controlling an airflow through a plurality of HVAC vents.

In another example of any of the above described methods for operating a fire suppression system isolating the zone from the at least one adjacent zone using the HVAC system comprises generating at least one air current.

In another example of any of the above described methods for operating a fire suppression system providing the localized response comprises removing power from at least one powered system within the identified zone.

In another example of any of the above described methods for operating a fire suppression system providing the localized response comprises limiting a fire suppressant activation to a subset of fire suppression nozzles corresponding to the identified zone.

In another example of any of the above described methods for operating a fire suppression system providing the localized response comprises interfacing with a building security system corresponding to the identified zone.

These and other features of the present invention can be best understood from the following specification and drawings, the following of which is a brief description.

DETAILED DESCRIPTION

Figure 1:
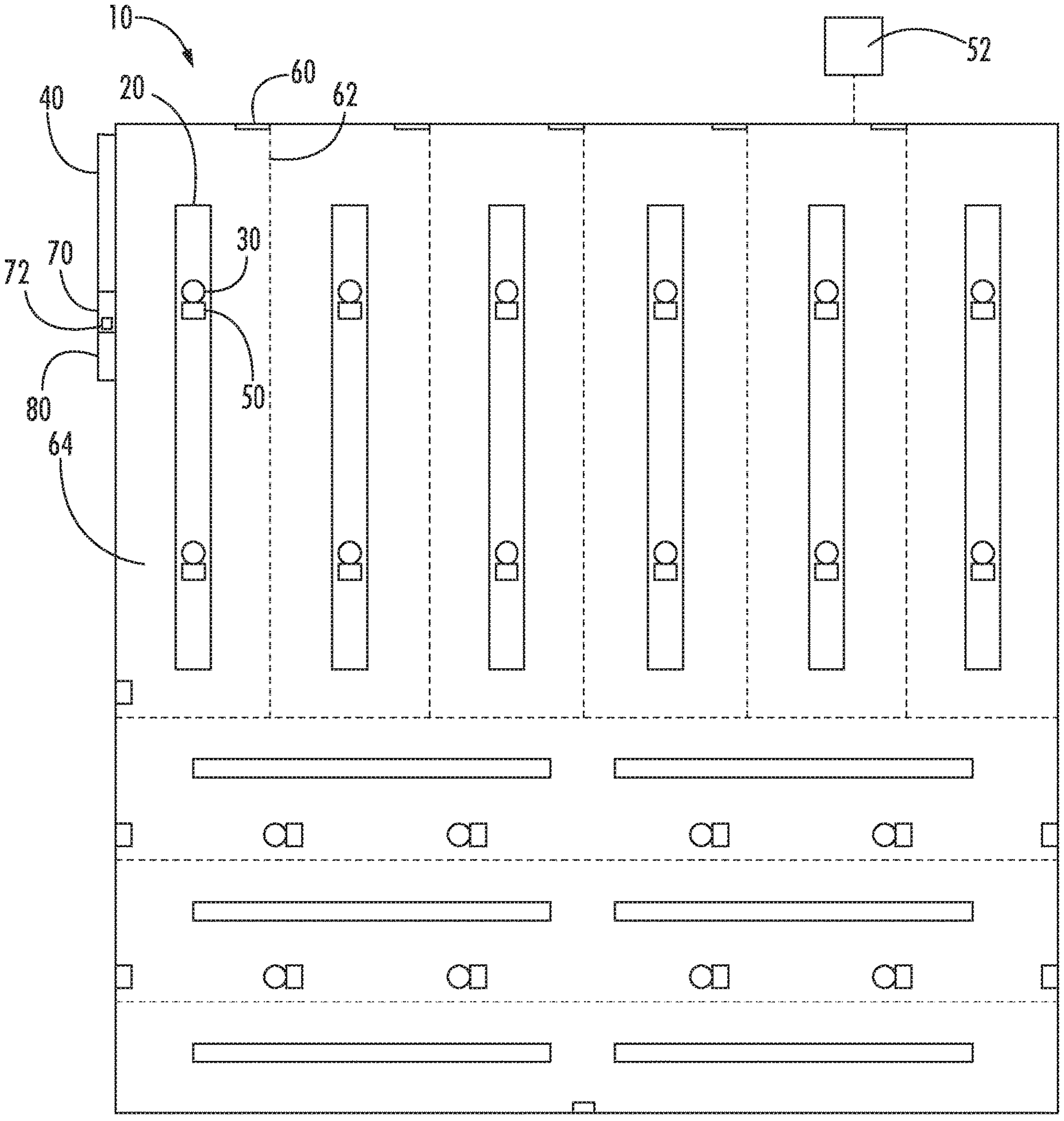
FIG. 1 illustrates a single floor of an exemplary building including multiple building systems integrated with a fire detection system via a controller.

FIG. 1 schematically illustrates an exemplary floor 10 of a building such as a data center. Included within the floor 10 are multiple server racks 20. In alternative examples, any number of other building systems that may be critical for one or more operations can be included in place of, or in addition to, the server racks 20, and the integration between fire detection systems 30 and the building systems can function in a similar manner. Distributed about the floor 10 are multiple individually addressable fire detection systems 30. As used herein, "individually addressable" elements, such as the individually addressable fire detection systems 30, refers to elements in a configuration where a controller or operator is able to uniquely identify from which element a signal originates within the configuration of elements.

In one example, the fire detection systems 30 are fiber-based high sensitivity smoke detectors (HSSD). By way of example, the HSSD fire detection systems 30 can be of the type disclosed in any of Published PCT Applications WO2018089477A1, WO2018089660A1, WO2018089480A1, WO2018089629A1, and WO2018089473A1 which are hereby incorporated by reference. In another example, the fire detection systems 30 can include temperature sensors. In yet another example, the fire detection systems 30 can be any other fire detection systems 30 where the detectors are uniquely addressable, including a combination of temperature sensors and HSSD detectors. In some examples, the fire detection systems 30 can be a combination of different types of sensors, and not every fire detection system 30 will be identical.

Each of the fire detection systems 30 is communicatively connected to a controller 40, such as a building control system. The connection can be wireless, hardwired, connected by a fiber data cable, or a combination thereof. The controller 40 is integrated with, and able to provide control instructions to some or all of, a building fire suppression system, a building alarm and security system, a heating ventilation and cooling (HVAC) system, and a building power supply system. In other implementations, the controller 40 can be integrated with any other number of building systems in order to provide further integrated responses to a detected fire or other threat.

In addition to the fire detection systems 30, multiple fire suppression nozzles 50 are distributed about the floor 10. The fire suppression nozzles 50 are fluidly connected to a fire suppressant tank 52, or multiple fire suppressant tanks 52. The nozzles 50, tanks 52, and control system (including at least the controller 40) for controlling the nozzles 50 and tanks 52 is referred to in general as the fire suppression system. In the illustrated example, each of the fire suppression nozzles 50 is positioned in approximately the same location as a corresponding fire detection system 30. In alternative examples, the nozzles 50 can be dispersed about the floor 10 in any pattern and are not placed proximate to a corresponding fire detection system 30. As described more fully below, fire detection systems 30 are placed at or near optimal locations for detection of fire, smoke, and/or other hazards, while nozzles 50 are placed at or near optimal locations for fire suppression, e.g. in proximity to or in range of server rack 20. Each of the nozzles 50 is connected to a fire suppressant system and is independently controlled by the building controller 40. The independent controls provided by the building controller 40 allow the controller 40 to activate only the fire suppression nozzles 50 relevant to respond to a given fire event, such as those nozzles 50 in range of the detected event, and leave the remaining nozzles 50 deactivated.

In addition to the fire suppression nozzles 50, an HVAC system is connected to multiple vents 60, and air curtain sources 62. The vents 60 and air curtain sources 62 are dispersed throughout the floor 10. The building controller 40 is configured to control the vents 60 and air curtain sources 62 to isolate zones 64 of the floor 10, with the isolated zone 64 corresponding to a location where a fire has been detected, or where a precursor to a fire is detected. In alternative examples, the air curtain sources 62 can be omitted, and the vents 60 can be operated by the controller 40 to generate airflows into and out of the room that isolate the zones 64.

The building control system 40 is also interconnected with a building security system 70, including an alarm system 72, and a building power supply system 80. The building security system 70 includes locking and unlocking controls and can ensure that authorized personnel are allowed into and/or out of the floor 10 when a fire occurs. Similarly, the power system 80 controls power to each of the server racks 20, as well as other systems within the floor 10. In addition, the power system 80, or the controller 40, is configured to communicate with the server racks 20 regarding impending power changes such as shut downs. When a fire is detected the building power system 80 can remove power from the affected server racks 20 or other systems, thereby preventing electrical damage from being exacerbated or from short circuits and similar problems impacting other server racks 20 outside of zone 64.

Figure 2:
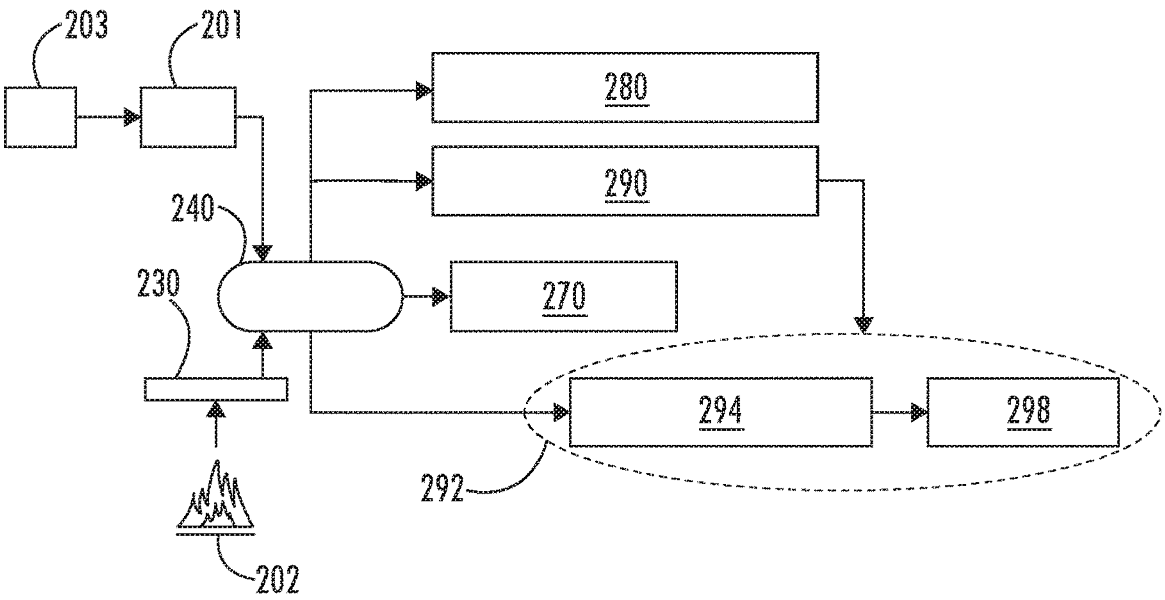
FIG. 2 illustrates a system chart demonstrating the integration between the fire detection and suppression systems and other building systems of FIG. 1.

With continued reference to the room configuration of FIG. 1, FIG. 2 illustrates an interconnection of the fire suppression system 292 and the fire detection systems 230 through a building controller 240 (also see 40 in FIG. 1). Initially a fire 202 is detected by one or more of the detection systems 230. The detection system(s) 230 detecting the fire provide a signal to the building controller 240 indicating that a fire is detected. As each of the fire detection systems 230 is individually addressable, the building controller 240 can identify a zone 64 (FIG. 1) in which a fire is occurring or is about to occur. Once the zone 64 has been identified, the building controller 240 can interface with a power system 280, an HVAC system 290, an alarm or security system 270, and a fire suppression system 292 to cause the systems 270, 280, 290, 292 to perform one or more corresponding actions to isolate and protect the zone 64 in which the fire is detected. The interface can be via any known communication protocol and via any known communication method (e.g. wired connection, Bluetooth, wifi, etc.).

While the following describes one exemplary response sequence, it is understood that the integration of the individually addressable fire detection systems 230 with the building systems via the building controller 240 can allow for variations on, and additions to, the described sequence. Initially the fire is detected by the individually addressable fire detection systems 230, and the building control system 240 determines which zone 64 or zones 64 include the detected fire. The detection is performed in one example by using a map 203 identifying the locations of the fire detection systems 230 within the floor 10, with the map being stored in the building control system 240 memory 201. Once the zone 64 or zones 64 are determined, the zone 64 is isolated from a remainder of the room using the air curtain sources 62 and the vents 60 of the HVAC system 290. In alternative examples, the zone(s) 64 can be isolated by controlling the airflow into and out of the vents 60, and the air curtains can be omitted entirely.

Once the zone 64 is isolated, the building control system 240 causes the power systems 280 to inform the components in the server racks 20 of the zone(s) 64 experiencing the hazard that a shutdown is imminent. Once each of the components within the server rack 20 have shut down, the power system 280 removes electrical power from the zone(s) 64 that are affected. Approximately simultaneously with depowering the server racks 20, the building control system 240 interacts with the security systems 270 to ensure that any people have exited the room. If the room is empty, the building control system 240 can cause the security systems 270 to lock the entryway, thereby preventing people from entering the floor 10 while an ongoing hazard is present. In alternative examples, the security system 270 can override locks and allow free access to the floor 10 without checking credentials in order to allow emergency responders access to the floor 10.

Once the HVAC systems 290 have isolated the zone(s) 64 where the fire is occurring, the fire suppression system 292 is activated. In the illustrated example, the fire suppression system includes two components, a pre-suppression system 294 and a sprinkler 298. Alternative fire suppression systems may be utilized to similar effect. The initial activation of the fire suppression system 292 activates the pre-suppression system 294. The pre-suppression system 294 operates by dispersing a fire suppressant, such as an inert gas, to the detected hazard zone 64, and using the vents 60 of the HVAC system 290 to vent ambient air out of the detected hazard zone 64. In addition to the venting, the HVAC system 290 can use air curtains from the air curtain sources 62 to contain the fire suppressant to the hazardous area. In the event that the fire detection systems detect that the fire is increasing, or the hazard has not been eliminated additional fire suppression methods, such as liquid suppressants can be dispersed from a sprinkler system 298

While described as occurring "approximately simultaneously" in the process above, one appreciated variation on the process allows the building system controller 240 to interface with the servers in the server rack 20, or the other critical systems within the hazard zone(s) 64, and provide warning and management of the responses depending on the severity of the fire hazard. By way of example, the building control system 240 can interface with a server in rack 20 and inform the system of an impending power shutdown. In response, the server in rack 20 can request a delay of the shutdown for a sufficient time period to perform an emergency backup of critical systems and/or data. Similar interactions and warnings can be provided from the building system controller 240 to each of the various integrated building systems, thereby allowing the fire suppression response to be modified according to the specific needs of the equipment and personnel within the hazard zone(s) 64. The targeting of the response to the specific zone in which the fire, or other hazard, is detected is referred to as a localized response.

Figure 3:
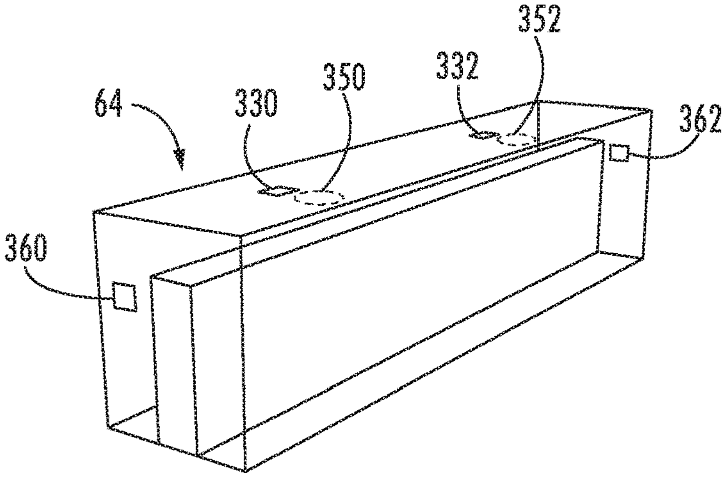
FIG. 3 isometrically illustrates a single zone of the floor plan illustrated in FIG. 1.
Figure 4:
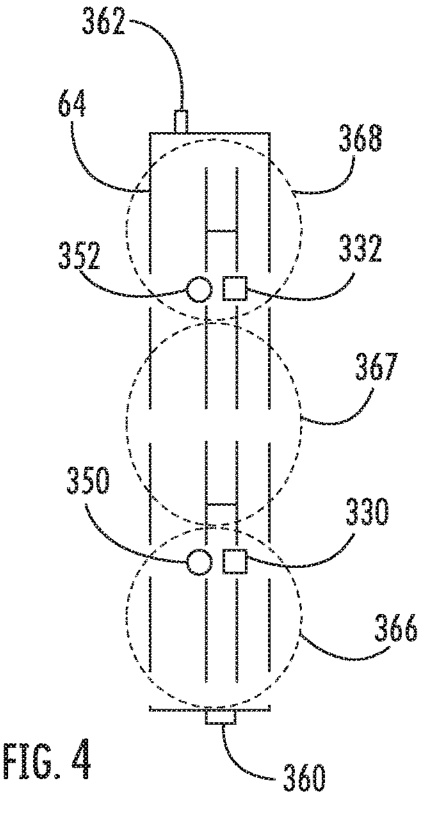
FIG. 4 schematically illustrates a top view of the single zone of FIG. 3.

With continued reference to FIGS. 1 and 2, FIGS. 3 and 4 schematically illustrate an exemplary hazard zone 64 in an isometric view (FIG. 3) and from a top view (FIG. 4). The hazard zone 64 in the example of FIGS. 3 and 4 is isolated using a pair of vents 360, 362 with the first vent 360 pushing air into the zone 64, and the second vent 362 drawing air out of the zone 64. The air flow through the vents 360, 362 is used to prevent air from adjacent zones from entering the zone 64, thereby isolating the zone 64. Immediately above the zone 64 are multiple nozzles 350, 352, with each of the nozzles 350, 352 being connected to a fire suppression system and controlled by the building controller such as exemplary fire suppression system 292 and exemplary controller 240 of FIG. 2.

The fire detection systems 330, 332 in the illustrated example are able to detect specific sub-zones 366, 367, 368 within the zone 64 depending on which detection system 330, 332 detects a fire. By way of example, if only detection system 330 detects a fire, the building controller determines that the fire is within the bottom subzone 366. If both fire detection systems detect a fire, then the fire is determined to be within the middle sub-zone 367, and if only the second detection system detects a fire the top sub zone 368 is determined to be the position of the fire. In alternative examples, alternative ways of determining the position of the fire can be utilized to similar effect.

Once the sub-zone 366, 367, 368 has been determined fire suppressant is provided from at least one of the nozzles 350, 352 corresponding to the sub-zone 366, 367, 368. In the example of FIG. 4, the nozzles 350, 352 are deployed when the fire detection system 330, 332 that is adjacent detects a fire. In alternative examples, the nozzles 350, 352 are dispersed one per sub-zone 366, 367, 368 and deploy when a fire is detected in the corresponding sub-zone 366, 367, 368. By way of example, the bottom nozzle 350 and the top nozzle 352 serve respective bottom and top sub-zones. When fire is detected in sub-zone 366, the bottom nozzle 350 is activated, and the top nozzle 352 is not activated. Conversely, when fire is detected in sub-zone 368, the top nozzle 352 is activated but not the bottom nozzle 350. When fire is detected in zone 367, both the top nozzle 352 and the bottom nozzle 350 are activated.

In another implementation of the above described integration, the amount of fire suppressant required to be dispersed in any given fire event is substantially reduced by controlling the HVAC systems with the vents 60 and air curtain sources 62. As the zones 64 can be isolated using the integrated systems, the amount of suppressant required is limited to the amount for the corresponding zone 64, rather than the amount for the entire room. In this way, the size of any given suppressant source can be limited to reduce the floor space taken up by the suppressant, and the costs associated with suppressing a fire are substantially reduced. Further, the integration of the HVAC system can allow the flow of suppressant to be controlled, thereby limiting exposure of adjacent servers or server racks to the suppressant to be limited. This allows suppressants that may be damaging to servers to be employed, as the suppressant will have minimal contact with servers outside of the hazard zone.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An integrated fire suppression system comprising:

a plurality of fire detection systems, each of the fire detection systems being individually addressable;

a control system communicatively coupled to each of the fire detection systems in the plurality of fire detection systems;

a plurality of building systems communicatively connected to the control system, the plurality of building systems including at least one of a fire suppression system, an alarm system, a heating ventilation and cooling (HVAC) system, a building power supply system, and a building security system; and wherein the control system is configured to provide a localized response to a fire detection by at least one fire detection system in the plurality of fire detection systems, the localized response comprising a response in at least one of the plurality of building systems, and wherein the plurality of building systems comprises the building power supply system, and wherein the localized response comprises a power shut down localized to a hazard zone, and wherein the power shut down comprises a notification to a critical system within the hazard zone, and a power shutdown delay dependent on a backup time required for the critical system.

2. The integrated fire suppression system of claim 1, wherein the plurality of fire detection systems comprises a plurality of fiber based high sensitivity smoke detectors.

3. The integrated fire suppression system of claim 1, wherein each fire suppressant nozzle at least partially defines at least one fire suppression zone.

4. The integrated fire suppression system of claim 1, wherein the HVAC system is configured to isolate a hazard zone of a room at least partially using a plurality of vents.

5. The integrated fire suppression system of claim 1, wherein the HVAC system further comprises a plurality of air curtain sources.

6. The integrated fire suppression system of claim 1, wherein the control system comprises a memory storing a map correlating each fire detection system with a corresponding building location.

7. The integrated fire suppression system of claim 6, wherein the plurality of building systems comprises a security system, and wherein the security system is configured to identify a location of the fire detection.

8. The integrated fire suppression system of claim 1, wherein the localized response comprises isolating the zone using at least two of the plurality of building systems.

9. The integrated fire suppression system of claim 1, wherein the control system is configured to detect a specific sub-zone within the zone depending on which fire detection system detects a fire.

10. An integrated fire suppression system comprising:

a plurality of fire detection systems, each of the fire detection systems being individually addressable;

a control system communicatively coupled to each of the fire detection systems in the plurality of fire detection systems;

a plurality of building systems communicatively connected to the control system, the plurality of building systems including at least one of an alarm system, a heating ventilation and cooling (HVAC) system, a building power supply system, and a building security system;

wherein the control system is configured to provide a localized response to a fire detection by at least one fire detection system in the plurality of fire detection systems, the localized response comprising a response in at least one of the plurality of building systems, and wherein the localized response comprises isolating a zone in which the fire detection occurred and subsequently detecting a specific sub-zone within the zone depending on which fire detection system detects a fire; and wherein the plurality of building systems comprises the building power supply system, wherein the localized response further comprises a power shut down localized to a hazard zone, and wherein the power shut down comprises a notification to a critical system within the hazard zone, and a power shutdown delay dependent on a backup time required for the critical system.

11. The integrated fire suppression system of claim 10, wherein the plurality of building systems comprises the HVAC system, and wherein the HVAC system comprises a plurality of vents and a plurality of air curtain sources, and wherein the zone is isolated using at least one of the plurality of vents or at least one of the plurality of air curtain sources.

12. The integrated fire suppression system of claim 11, wherein the zone is isolated using at least one of the plurality of vents and at least one of the plurality of air curtain sources.

13. The integrated fire suppression system of claim 11, including a plurality of independently activated fire suppressant nozzles located within the zone, and wherein each sub-zone is associated with at least one independently activated fire suppressant nozzle of the plurality of independently activated fire suppressant nozzles, and in accordance with a determination of a specific identified sub-zone detecting a fire, controlling only an associated independently activated fire suppressant nozzle for that sub-zone.

14. The integrated fire suppression system of claim 10, wherein the plurality of building systems comprises a security system, and wherein the building security system is configured to identify a location of the fire detection.

15. The integrated fire suppression system of claim 10, wherein the plurality of building systems includes the alarm system, the building power supply system, and the building security system.

* * * * *